United States Patent [19]

Blossey et al.

[11] 4,035,810

[45] July 12, 1977

[54] MAGNETIC INTERPOSITIVE METHOD WITH ELECTROSTATIC IMAGING

[75] Inventors: Daniel F. Blossey, Rochester; Stephen F. Pond, Fairport, both of N.Y.

[73] Assignee: Xerox Corporation, Stamford, Conn.

[21] Appl. No.: 662,675

[22] Filed: Mar. 1, 1976

[51] Int. Cl.$^2$ .................. G03G 19/00; G11B 5/027

[52] U.S. Cl. .................................. 346/74.1; 360/59

[58] Field of Search ............... 360/59, 16; 346/74.1

[56] References Cited

U.S. PATENT DOCUMENTS

| | | | |
|---|---|---|---|
| 2,793,135 | 5/1957 | Sims | 346/74.1 |
| 2,857,290 | 10/1958 | Bolton | 346/74.1 |
| 2,970,299 | 1/1961 | Epstein | 346/74.1 |
| 3,611,420 | 10/1971 | Benoit | 360/59 |
| 3,612,759 | 10/1971 | Nelson | 360/59 |
| 3,804,511 | 4/1974 | Rait | 346/74.1 |

*Primary Examiner*—Jay P. Lucas
*Attorney, Agent, or Firm*—James J. Ralabate; Richard A. Tomlin; George J. Cannon

[57] ABSTRACT

An improved magnetic interpositive imaging method is provided by creating an electrostatic latent image in a photoconductive member comprising photoconductive material dispersed in a binder; developing by touch-down development said electrostatic latent image with toner comprising from about 10% to about 60% by volume hard magnetic material; fixing said toner to said photoconductive binder; magnetizing said fixed toner; and, transferring the magnetic signal from said magnetized, fixed toner by thermoremanent transfer of magnetization to a magnetizable recording medium.

15 Claims, 4 Drawing Figures

MAGNETIC INTERPOSITIVE METHOD WITH ELECTROSTATIC IMAGING

BACKGROUND OF THE INVENTION

This invention relates to magnetic imaging and more particularly to an improved method of creating latent magnetic images on magnetizable recording media via magnetic interpositives.

There has recently been introduced a magnetic imaging system which employs a latent magnetic image on a magnetizable recording medium which can then be utilized for purposes such as electronic transmission or in a duplicating process by repetitive toning or transfer of the developed image. Such latent magentic image is provided by any suitable magnetization procedure whereby a magentized layer of marking material is magnetized and such magnetism transferred imagewise to the magnetic substrate. Such a process is more fully described in U.S. Pat. No. 3,804,511 to Rait et al.

As is disclosed in that patent, an optical image can be reproduced by first reducing it to a graphical image but employing a magnetizable marking material. Such magentizable material is typically electroscopic toner comprising a ferromagentic magerial which, after image formation is susceptible to magnetization. There is thus formed an imagewise pattern of magnetization which pattern is then transferred to a magnetic substrate by any one of several methods as disclosed in the patent. Preferably, the magnetization in imagewise pattern is produced in a magnetic substrate by the anhysteretic method whereby the magnetized graphic image is brought into intimate contact with a magnetic substrate and while in contact is subjected to an A.C. signal from a recording head. The magnetic substrate is thereby magnetized in image configuration in accordance with the graphic image. Other methods of utilizing the magnetized graphic image for producing a latent magnetic image are also disclosed such as by providing intimate contact between the graphic magnetic material and a previously uniformly magnetized substrate and applying an erase signal through the graphic image support thereby applying the magnetic image as a shunt for the erase signal. There is thus produced by selective erasure in background areas a latent magnetic image in those areas shunted by the magnetic graphic image. Various other methods of providing such latent image utilizing a previously formed magnetizable graphic image are disclosed in the patent referred to above.

One desires to form a latent magnetic image having the highest possible degree of magnetization such that its detection by any of the several methods is facilitated. The process variations inevitable in prior art imaging systems whereby the magnetizable graphic image is produced causes variations in toner depth, uneveness of the surface of the image and background problems. Such variations make difficult the creation of high quality latent magnetic images by the methods referred to in the prior art.

Furthermore, the electrostatographic, including xerographic techniques utilized to provide the magnetized graphic image interpositive for producing a latent magnetic image on a magnetizable recording medium requires the use of a toner which is properly triboelectrically charged so as to become attracted to the latent electrostatographic image. The toner must also contain magnetizable materials so that the developed electrostatographic image can be magnetized to form the magentic interpositive. The inclusion of magnetic materials in the toner invariably adversely affects the triboelectric characteristics of the toner and thereby resulting in a loss of quality in the developed image from that which would ordinarily be obtained upon developing the same latent electrostatographic image with commercially available toner which does not contain a magnetic component.

Further, recording heads used in transferring the magnetic signal from the magnetized interpositive to a magnetizable recording medium typically have a lifetime of only a few hundred of hours. This presents a significant reliability problem in magnetic imaging schemes.

The present invention provides an improved interpositive magnetic imaging scheme wherein a preferred pathway of interpositive magnetic imaging is provided.

SUMMARY OF THE INVENTION

Therefore, an object of this invention is to provide a magnetic interpositive imaging method which overcomes the above noted deficiencies.

Another object of this invention is to provide an improved magnetic interpositive imaging scheme.

Another object of this invention is to provide latent magnetic images of improved quality.

A further object of this invention is to provide a magnetic interpositive imaging scheme of improved reliability.

These and other objects of this invention will be apparent from reading the following description of the invention.

In accordance with the present invention there is provided an improved magnetic interpositive imaging scheme wherein superior latent magnetic images are produced by means of an improved interpositive pathway. The improved interpositive pathway comprises the steps of creating an electrostatic latent image in a photoconductive member comprising photoconductive material immersed in a binder; developing by touchdown development said electrostatic latent image with toner comprising from about 10% to about 60% by volume hard magnetic material; fixing said toner to said photoconductive binder; magnetizing said fixed toner; and, transferring the magnetic signal from the magnetized, fixed toner by thermoremanent transfer magnetization to a megnetizable recording medium.

DETAILED DESCRIPTION OF THE PREFERRED EMBODIMENTS

Figure 1:
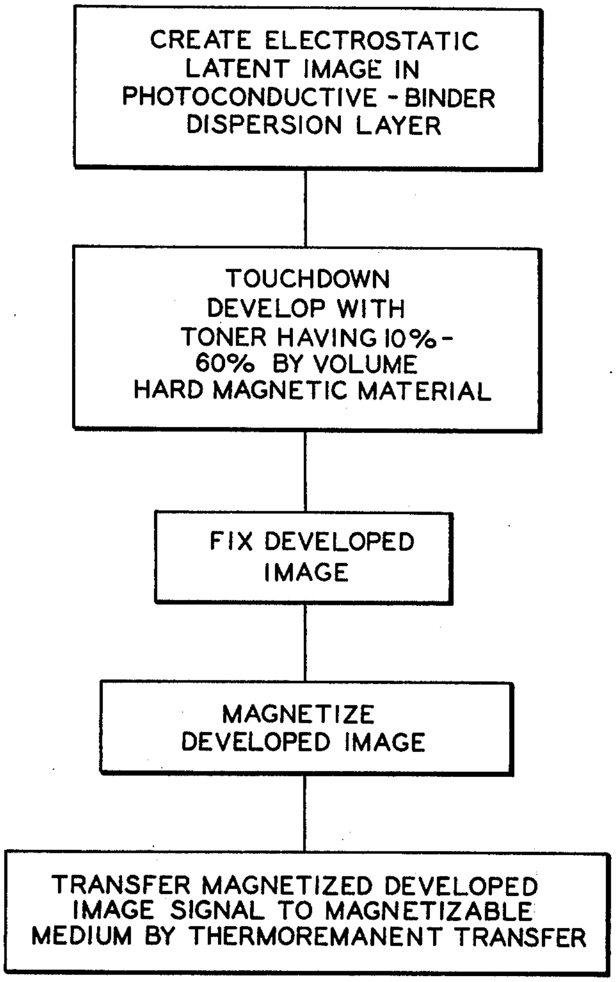
FIG. 1 is a flow chart of the method practiced in accordance with this invention.

Referring now to FIG. 1, there is shown a flow chart of the improved magnetic interpositive imaging scheme provided by this invention. An optical image, or, for example, any original document, is first copied as an electrostatic latent image by classical xerographic charge and expose steps onto a photoconductor comprising photoconductive material dispersed in a binder. The resulting electrostatic latent image is then developed by touchdown development with a toner having both an electostatically attractable component and a magnetically attractable component. The magnetically attractable component in the toner comprises a hard magnetic material and is present in the toner in the amount of about 10% by volume to about 60% by volume. The phrase "hard magnetic material" is used herein to mean permanent magnetic material; i.e., magnetic material which can retain its magnetization when not subjected to the influence of a magnetic field.

Any photoconductor comprising photoconductive material dispersed in a binder can be employed. Typical suitable photoconductive materials include inorganic photoconductors such as zinc oxide, cadmium sulfide, zinc sulfide, lead sulfide, cadmium selenide, selenium, lead iodide, lead chromate, and mixtures thereof; organic photoconductors such as phthalocyanine, triphenyl amine, 2,4-bis(4,4-diethylaminophenyl)-1,3,4-oxadiazole, N-isopropylcarbazole, triphenyl pyrrol, 4,5-diphenylimidazolidinone, 1,4-dicyanonaphthalene, 2,-mercapto-benz-thiazole, 2,4-diphenylquinazoline, 5-benzedeneaminoacenaphthalene and mixtures thereof. Typical suitable binders include polystyrene resins, silicone resins, acrylic and methacrylic polymers and copolymers and mixtures thereof. Inorganic photoconductive materials dispersed in a binder in accordance with U.S. Pat. Nos. 2,663,636 and 3,121,006 to Middleton, hereby expressly incorporated by reference, are preferred for use due to each of fabrication, susceptibility to pressure fixing of the toner thereto, and disposability subsequent to use in the practice of the present invention.

Typical suitable hard magnetic materials include cobaloy, chromium dioxide, $\gamma$-$Fe_2O_3$, barium ferrite, lead ferrite, strontium ferrite, samarium cobalt, alloys of aluminum-nickel-cobalt, cobalt ferrite, magnetite, manganese arsenide, and mixtures thereof. The hard magnetic material is present in the toner from about 10% by volume to about 60% by volume, the remaining volume of the toner being occupied by electroscopic marking material and resins utilized in xerographic toner manufacture.

The electrostatic latent image is developed with the aforementioned toner comprising hard magnetic material by the inductive technique commonly referred to as magnetic toner touchdown development. Magnetic toner touchdown development, generally speaking, is a technique wherein a substantially uniform layer of toner comprising magnetic material is provided in a conductive substrate and brought either closely adjacent to but out of contact with the electrostatic latent image or in contact with the electrostaic latent image. The magnetic material in the toner acts as an extension of the conductive backing and therefore acquires charge induced therein by the electrostatic latent image of a polarity opposite to that in the electrostatic latent image. The conductive substrate can be biased to assist in transfer of toner to the electrostatic latent image. However, a conductive bakcing is not essential to the practice of touchdown development as seen from copending application U.S. application Ser. No. 653,871, filed January 30, 1976 wherein a microfield donor member uniformly loaded with toner comprising magnetic material is prepared for utilization in touchdown development of latent images.

Microfield donor members for toners having magnetic material therein generally comprise a flexible substrate having a magnetizable overcoating. The magnetizable overcoating is provided with a microfield pattern of alternating spatial areas of magnetic polarizations which form gradients of magnetization at the interfaces of the recorded areas. These microfield patterns can be provided by recording with an alternating current recording head or by the improved technique disclosed in U.S. application Ser. No. 653,871, filed Jan. 30, 1976 wherein a periodic configuration of magnetizable material is utilized to provide the alternating spatial areas of magnetic polarizations. The microfields magnetic layer track the magentic material in the toner and therefore retain the toner on the surface of the microfield donor member. However, the toner will be attracted to a latent image by forces in excess of the force retaining the toner on the donor member. The latent image force can be either magnetic or electrostaatic, and therefore microfield donor members can be employed to develop either electrostatic latent images or magnetic latent images.

Accordingly, the phrase "touchdown development" is utilized herein to mean either the development of a latent image with toner from a donor member spaced apart from and not in contact with the member in which the latent image resides or in contact with the member in which the latent image resides; including the development scheme depicted in U.S. Pat. No. 3,849,161 hereby expressly incorporated by reference.

After development of the electrostatic latent image in the photoconductor-binder member by touchdown development with a toner comprising hard magnetic material from about 10% to about 60% by volume, the developed image is fixed to the photoconductor-binder member. Any fixing method can be employed. Typical suitable fixing methods include heating the toner in the developed image to cause the resins thereof to at least partially melt and become adhered to the photoconductor-binder member, the application of pressure to the toner optionally accomplished with heating such as the use of a heated roller, solvent or solvent vapor to at least partially dissolve the resin component of the toner, or any combination of the above. The photoconductor-binder member is typically sufficiently hard to allow fixing solely by the application of pressure such as, for example, by a contact roller in an amount sufficient to calender the toner. These techniques are conventional in the art of fixing of toner and need not be elaborated upon herein.

Subsequent to fixing the developed image, the developed image is magnetized. This step of magnetization can be achieved by utilizing conventional recording electronics such as, for example, a magnetic recording head adjusted to provide a spatial magnetization frequency of from about 4 to about 60 cycles per millimeter; or, if a thermoremanent material such as chromium dioxide was utilized as the hard magnetic material in the toner, by thermoremanent magnetization transfer from a master medium having a spatial magnetization frequency of about 4 to about 60 cycles per millimeter. The thermoremenent magnetization technique is preferred for magnetizing the fixed, developed image because this technique obviates the need for recording electronics.

Subsequent to magnetizing the fixed, developed image on the photoconductor-binder member, recording of the magnetized image in the form of a magnetic latent image is achieved by thermoremanent transfer. Speaking generally, thermoremanent transfer involves utilization of the phenomenon known as theremoremanent magnetization. This phenonmenon involves the disappearance of ferromagnetism into paramagnetism as a material's temperature is raised to its Curie point, $T_c$. Below $T_c$ there is another temperature, $T_b$, the blocking temperature, which marks the onset of superparamagnetism. Recording or transfer utilizing theremoremanent magnetization relies upon the step of cooling the magnetic media from a temperature greater than or equal to $T_c$ down to a temperature less than or equal to $T_b$, while in the presence of a magnetizing field. The magnetic field is supplied in the step of creating a latent magnetic image by the magnetized developed image fixed on the photoconductor-binder member.

The use of theremoremanent transfer to transfer the magnetized interpositive signal to the magnetizable recording medium in accordance with the practice of this invention is preferred because image resolution in excess of 40 line pairs per millimeter can be obtained and recording heads can be eliminated; the Curie points of some thermoremanent materials are easily accessible, e.g., for chromium dioxide, $T_c$ = about 130° C, with Xenon flash energies of $2.6 \times 10^6$ ergs/cm$^2$. Significantly, gain in magnetization strength in the latent magentic image can be obtained over the magnetization strength of the magnetized developed image on the photoconductor-binder member by thermoremanent transfer. The efficiency of thermoremanent transfer enables a relaxation of the materials requirements from those imposed by anhysteretic remanent magnetization. While any means of heating above $T_c$ can be employed such as, for example, heated shoe contact, heated roller, etc. gaseous discharge flash heating by Xenon, Argon, hydrogen, sodium, etc. flash lamps are preferred to avoid any concern over heat deformation of magentic tape substrates.

Figure 2:
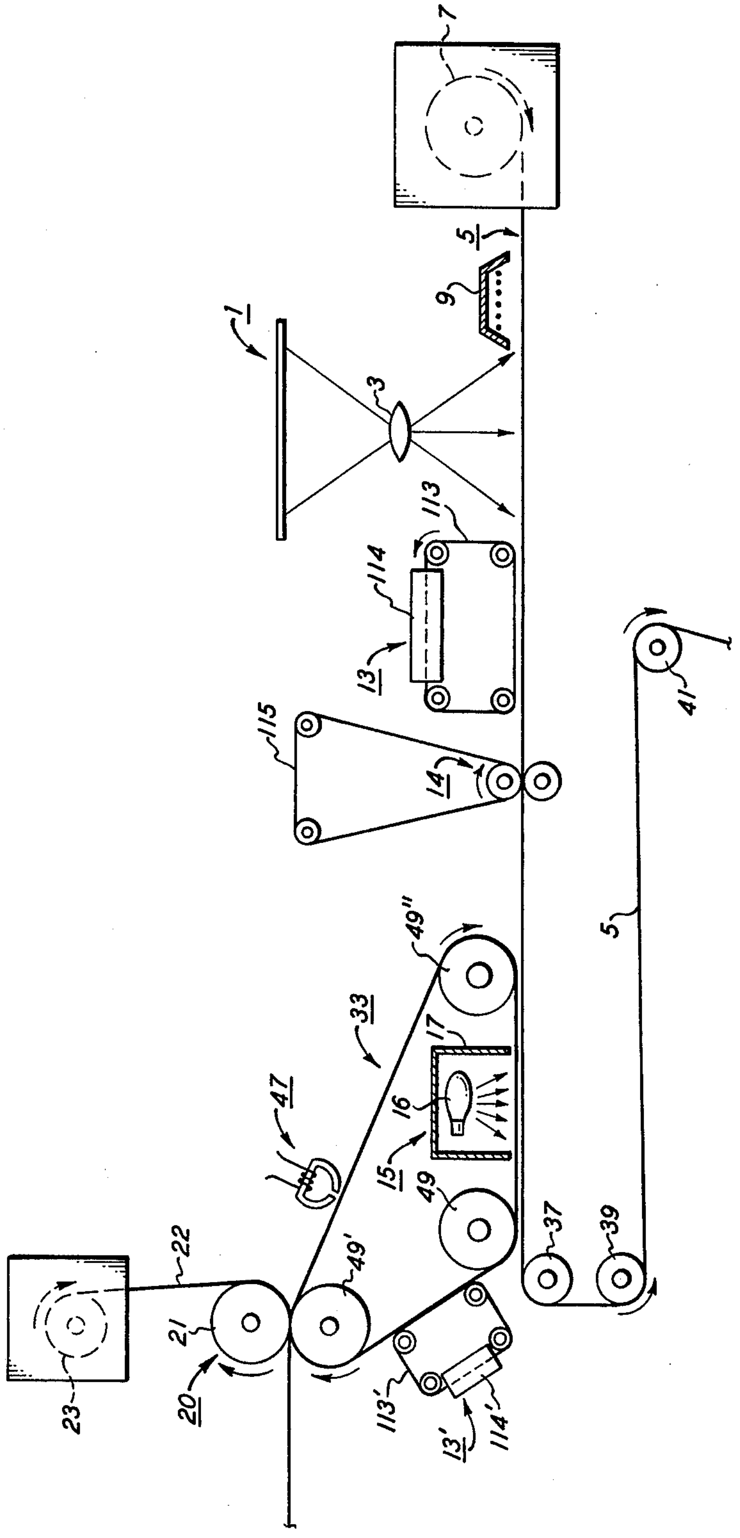
FIG. 2 is a diagrammatic view of one embodiment of this invention.

Referring now to FIG. 2, there is schematically illustrated a first embodiment of the present invention. In FIG. 2 an optical image of an original document 1 is focused through lens 3 onto photoconductor 5 comprising photoconductive material dispersed in a binder. The photoconductor 5 is fed from supply roll 7 through charging means 9 to the imaging station in alignment with lens 3. Photoconductor 5 preferably comprises zinc oxide dispersed in a binder and having a conductive backing such that it will support an electrostatic image. The image is provided by the selective discharge of photoconductor 5 by the exposure to light rays 11. Charging means 9 can be any suitable prior art means for imparting an electrostatic charge to the surface of photoconductor 5. Most preferably, a corona discharge device typically employed in the xerographic process is utilized.

Once an electrostatic latent image has been created in a photoconductor 5, the photoconductor is transported to a developing station 13 wherein electroscopic toner containing both electrostatically attractive and magnetically attractive components, is applied to the latent image by touchdown development from donor member 113. Donor member 113 has provided thereon a spatial pattern of microfields preferably created by magnetic pole spacings of from about 2.5 to about 50 times the average diameter of the toner particles employed. Donor member 113, in passing through toner disperser 114, is provided with a uniform layer of toner upon the surface of donor 113 which faces photoconductor 5 in the development zone 13. As previously mentioned, the toner comprises from about 10% by volume to about 60% by volume hard magnetic material and, preferably, a thermoremanent material such as chromium dioxide.

After having developed the latent electrostatic image with toner comprising hard magnetic material, photoconductor 5 carrying the developed image is brought into contact with fixing means 14. In FIG. 2, fixing means 14 is represented as a pair of heated rollers driven by means not shown which engage photoconductor 5 in the nip therebetween thereby applying a fixing pressure to the developed image, said pressure being preferably of magnitude sufficient to calender the toner image. Fixing means 14 can comprise any means for carrying out the aforementioned fixing steps such as, for example, solvent vapor spray means, solvent dip means, and various conventional heating means such as infrared radiation sources, heated shoes or heated rollers.

At fixing station 14 the devloped image on photoconductor 5 is simultaneously magnetized by thermoremenent transfer of magnetic signal from master medium 115 having provided thereon a spatial magnetization frequency of from about 4 to about 60 cycles per millimeter by any of the previously mentioned techniques. The location of the thermoremanent master medium 115 at the fixing zone 14 is optional but preferred because it provides simultaneous fixing and magnetization of the developed image residing on photoconductor 5. The upstream nip region between the heated rollers at fixing station 14 is held at a temperature which is slightly above the Curie temperature of the hard magnetic material present in the toner of the developed image. Simultaneous fixing and thermoremanent transfer of magnetic signals as depicted in FIG. 2, is optional and it is to be understood that the thermoremanent transfer station can be located downstream of the fixing location.

The magnetized, fixed, developed image residing on photoconductor 5 is then subjected to thermoremanent transfer of its magnetic signal to magnetizable recording medium 33 at thermoremanent transfer station 15. In FIG. 2, thermoremanent transfer station 15 is depicted in its preferred embodiment of gaseous discharge flash lamp 16 within housing 17. The radiant energy from flash lamp 16 strikes the underside of magnetizable recording medium 33 when the magnetized developed image on photoconductor 5 passes in proximity thereto. As previously described, during theremoremanent transfer, the presence of a magnetic field such as, for example, the magnetized developed image on photoconductor 5 during heating of magnetizable recording medium 33 above its Curie point results in the creation of a latent magnetic image in medium 33. This latent magnetic image has a stronger magnetic strength than that of the magnetized, developed image on photoconductor 5 and is in other respects a latent copy of the magnetized, developed image on photoconductor 5. Themoremanent transfer station 15 need not be limited to gaseous discharge flash exposure means but can comprise any means suitable for heating medium 33 above its Curie temperature.

The latent magnetic image created in magnetizable recording medium 33 is moved by drive rollers 49, 49' and 49'' successively through development station 13' where magnetic toner is deposited to develop the latent magnetic image, transfer station 20 where the magnetic toner is transferred in imagewise configuration to receiving medium 22, and erase station 47 where the latent magnetic image is erased from magnetizable recording medium 33. Development station 13′ can be any conventional development station and is depicted in FIG. 2 as a touchdown development station similar to touchdown development station 13. It will be appreciated, of course, that the toner residing on donor member 113′ need only comprise magnetic material which can be either hard or soft magnetic material because the latent image on medium 33 is a magnetic latent image rather than an electrostatic latent image. The magnetic toner utilized at development station 13′ preferably comprises a resinous material that can be fused to receiving medium 22 when brought into contact therewith under heat and pressure by heated roller 21. It will be understood that fixing need not occur at transfer station 20 but can optionally be provided downstream to transfer position 20 with respect to the flow of medium 22. In that case, a separate fusing station having conventional fusing means can be employed. While receiving medium 22 is depicted in FIG. 2 as being fed from supply roll 23, it will be appreciated that receiving medium 22 can be provided in any form; e.g., sheet, strip, web, etc.

Subsequent to transfer of the toner from the latent magnetic image on medium 33, the latent magnetic image is passed beneath erase head 47 suitably energized by a power source (not shown). Alternatively, the latent image can be electronically detected by known means at any suitable station in the circumference of the path of travel of medium 33. A typical facsimile transmission system is described in U.S. Pat. No. 3,749,833 to Rait et al which is hereby expressly incorporated by reference. Photoconductor 5 is moved by drive rollers 37, 39 and 41 to a convenient location for storage or disposal.

Figure 3:
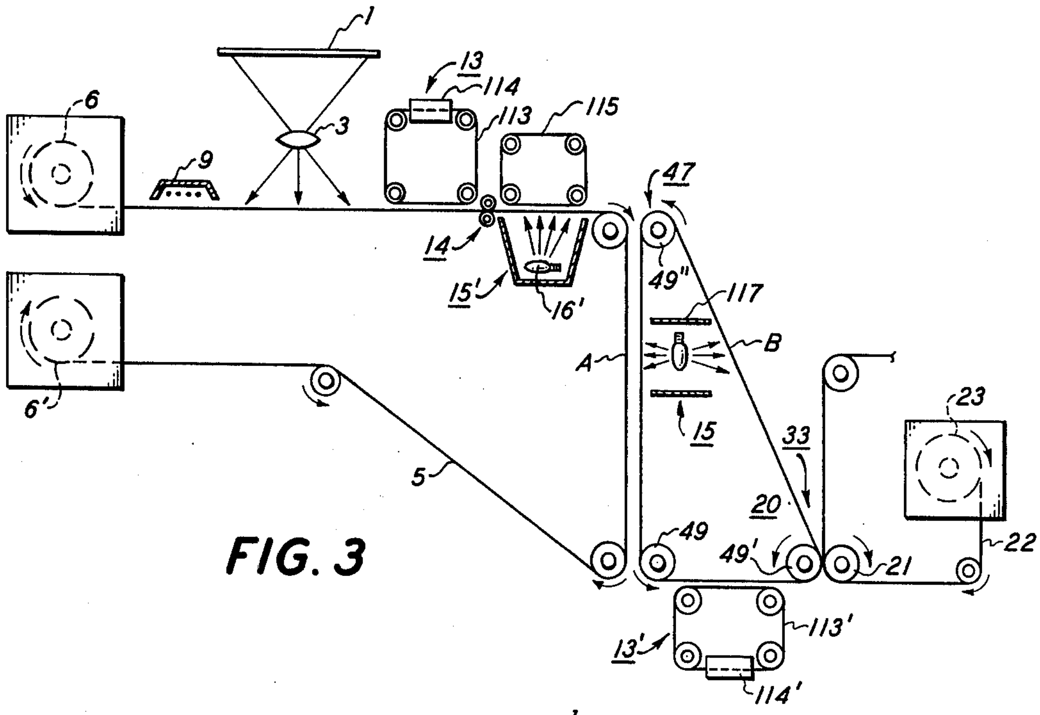
FIG. 3 is a diagrammatic view of another method in accordance with this invention.

Referring now to FIG. 3, there is seen another embodiment of the present invention wherein a compact arrangement of the various processing stations is depicted. Photoconductor memeber 5 comprising photoconductive material dispersed in a binder is provided by supply roll 6 and successively passes through charging, exposure, development, fixing, and magnetization prior to being wound around take-up roll 6′. Elements in FIG. 3 are the same as like numbered elements in FIG. 2. Magnetization of the fixed, developed image on photoconductor 5 is achieved in FIG. 3 by thermoremanet transfer utilizing a gaseous discharge flash lamp 16′ within housing 117′. The flash lamp source of heating in FIG. 3 takes the place of the rollers at fixing station 14 in FIG. 2. Photoconductor member 5 is provided with a photoenergy absorbing substrate such as a darkened paper or plastic. Magnetizable recording medium 33 is provided in the form of an endless web traveling over rollers 49, 49′ and 49″. At thermoremanent transfer station 15 gaseous discharge flash lamp 16 within housing 117 heats magnetizable recording medium 33 above its Curie point along portions A and B of medium 33. When the magnetized developed image on photoconductor 5 is in the proximity of portion A of medium 33, a latent magnetic image is created in portion A or medium 33 by thermoremanent transfer as previously described. The magnetic latent image is then developed at developing station 13′ and transferred to receiving medium 22 at transfer station 20.

The latent magnetic image residing on medium 33 then proceeds through portion B of its path of travel where it is again heated above its Curie point by gaseous discharge flash lamp 16. Since medium 33 along portion B of its path of travel is not under the influence of a magnetic field, it is erased when heated to its Curie point. Thus, FIG. 3 graphically depicts the utilization of Curie point heating for both the creation of the magnetic latent image and the erasure thereof. As stated with respect to FIG. 2, thermoremanent transfer is not limited to heating with the gaseous discharge flash lamp but can be practiced by any suitable means which will heat the magnetizable medium above the Curie point thereof. Further, while touchdown development is employed to develop the electrostatic latent image residing on photoconductor 5, any suitable development technique can be employed at developing station 13′ for the development of the magnetic latent image residing on medium 33. Typical suitable development methods include cascade development, biased electrode development, powder cloud development, and liquid development. It will be appreciated, of course, that when electrostatic development techniques are employed the toner utilized at development station 13′ comprises an electrostatically attractable component.

Figure 4:
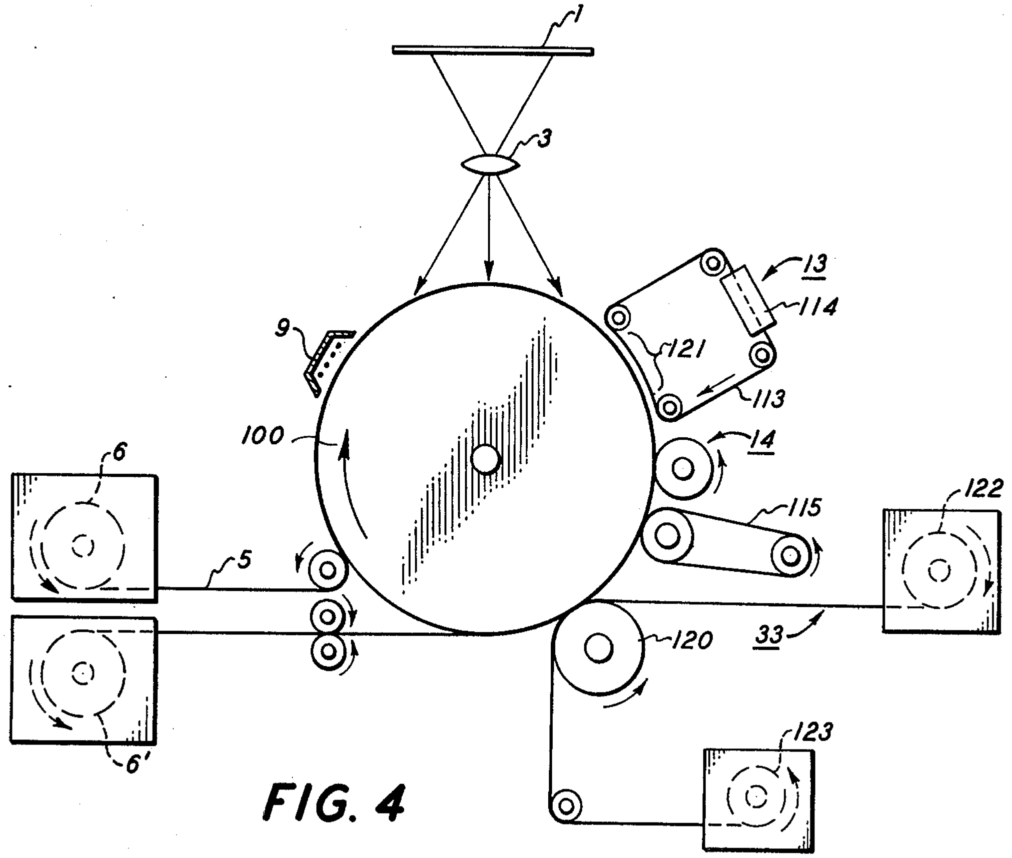

FIG. 4 schematically illustrates yet another embodiment of the present invention wherein like numbers represent identical elements found in FIGS. 2 and 3. In FIG. 4, the convenience provided by the practice of the present invention can be readily appreciated in that photoconductor 5 is cartridge loaded into supply roll 6 and gathered by take-up roll 6′. More significantly, magnetizable recording medium 33 is cartridge loaded into supply roll 122 and gathered by take-up roll 123. Providing magnetizable recording medium 33 in cartridges allows greater flexibility in that latent magnetic images corresponding to magnetized, developed images residing on photoconductor 5 are formed and are formed in the order in which the magnetized, developed images on photoconductor 5 are presented. Medium 33, after latent magnetic imaging, can be removed for storage and subsequent development with, and transfer of, magnetic toner in the creation of final copy. FIG. 4 also illustrates the fact that thermoremanent transfer can be effected with any suitable heating means such as, for example, heated rollers 14 and 120. In FIG. 4, arcuate guide means 121 is utilized to insure uniform spacing between the curvature of the drum 100 and touchdown donor member 113 in order to obtain uniform development of the electrostatic latent image formed on photoconductor 5.

Other modifications and ramifications of the present invention will occur to those skilled in the art upon a reading of the present disclosure. These are intended to be included within the scope of this invention.

For example, as previously mentioned the magnetization of the fixed, developed electrostatic latent image residing on photoconductor 5 need not be limited to the thermoremanent techniques depicted in the drawings. As previously mentioned, other various thermoremanent techniques can be employed and conventional recording heads could be utilized in lieu of thermoremanent magnetization. However, as previously stated, thermoremanent magnetization is preferred for magnetization of the developed electrostatic latent image in addition to the thermoremanent magnetization transfer required by the practice of this invention of the magnetic signal from the magnetized developed image residing on photoconductor 5 to magnetizable recording medium 33.

Thus, there has been disclosed a novel, improved magnetic interpositive imaging system wherein the disadvantages of electronic recording heads are overcome and a gain in magnetic signal strength is provided upon thermoremanent transfer of the magnetic signal from the developed electrostatic image to magnetizable recording media during creation of the magnetic latent image on the magnetizable recording medium corresponding to the electrostatic image.

Other advantages provided by the practice of the present invention include the increase in system reliability upon obviating the need of magnetic recording heads, the relaxation of materials requirements due to the increased magnetic signal strength provided by creating the latent magnetic image; and, the improved quality of the final copy due to the utilization of touchdown development during development of the electrostatic latent image which allows a high magnetic pigment loading of the electroscopic toner without adversely affecting development of the electrostatic latent image.

What is claimed is:

1. An improved magnetic interpositive imaging method, comprising the steps of;

a. creating an electrostatic latent image in a photocondutive member comprising photocondutive material dispersed in a binder;

b. developing by touchdown development said electrostatic latent image with toner comprising from about 10% to about 60% by volume hard magnetic material;

c. fixing said toner to said photoconductive binder;

d. magnetizing said fixed toner to a spatial magnetization frequency of from about 4 to about 60 cycles per millimeter; and e. transferring the magnetic signal from said magnetized, fixed toner by thermoremanent transfer magnetization to a magnetizable recording medium.

2. The method of claim 1 wherein said fixing step (c) comprises the step of applying pressure to said toner sufficient to calender the toner.

3. The method of claim 1 wherein step (d) is performed by heating said fixed toner to a temperature of at least the Curie point of the hard magentic material therein and subjecting said hard magnetic material to a magnetic microfield pattern.

4. The method according to claim 3 wherein said heating is provided by a gaseous discharge lamp.

5. The method according to claim 1 wherein said hard magnetic material is selected from the group consisting of $\gamma$-$Fe_2O_3$, cobaloy, chromium dioxide, barium ferrite, lead ferrite, strontium ferrite, samarium cobalt alloys, alloys of aluminum, nickel and cobalt, cobalt ferrite, magnetite, manganese arsenide, and mixtures thereof.

6. The method according to claim 1 wherein said photoconductive material dispersed in a binder comprises zinc oxide.

7. The method according to claim 1 wherein step (e) comprises heating said magnetizable recording medium to at least its Curie point by exposure thereof to radiation from a gaseous discharge lamp and subjecting the magnetizable recording medium to the magnetic field of said magnetized, fixed toner.

8. Magnetic interpositive imaging apparatus comprising:

a. means for creating an electrostatic latent image;

b. touchdown development means for developing said electrostatic latent image with toner comprising hard magnetic material;

c. means for fixing said toner;

d. means for magnetizing said fixed toner at a spatial magnetization frequency of about 4 to about 60 cycles per millimeter; and e. means for transferring magnetic signal from said magnetized, fixed toner by thermoremanent transfer magnetization to a magnetizable recording medium.

9. The apparatus according to claim 8 wherein said means for magnetizing said fixed toner comprises means for magnetizing said fixed toner at a spatial magnetization frequency of about 4 to about 60 cycles per millimeter.

10. The apparatus according to claim 9 wherein said means for magnetizing said fixed toner comprises means for heating said toner to at least its Curie point and means for subjecting said heated toner to a magnetic microfield pattern.

11. The apparatus according to claim 10 wherein said means for heating said toner comprises a gaseous discharge lamp.

12. The apparatus according to claim 10 wherein the means for subjecting the heated toner to a magnetic microfield pattern comprises a magnetic microfield donor member.

13. The apparatus according to claim 8 wherein said means for transferring magnetic signals from said magnetized, fixed toner by thermoremanent transfer magnetization to a magnetizable recording medium comprises means for irradiating said magnetizable recording medium with a gaseous discharge lamp and means for subjecting said heated magnetizable recording medium to the magnetic field of said magnetized, fixed toner.

14. The apparatus according to claim 8 further including means for developing magnetic signals on said magnetizable recording medium with magnetic toner.

15. The apparatus according to claim 14 further including means for transferring said magnetic toner from said magnetizable recording medium to a receiving medium.

* * * * *